May 18, 1937. F. W. SLACK 2,080,748
MOTOR VEHICLE FRAME
Filed June 15, 1935
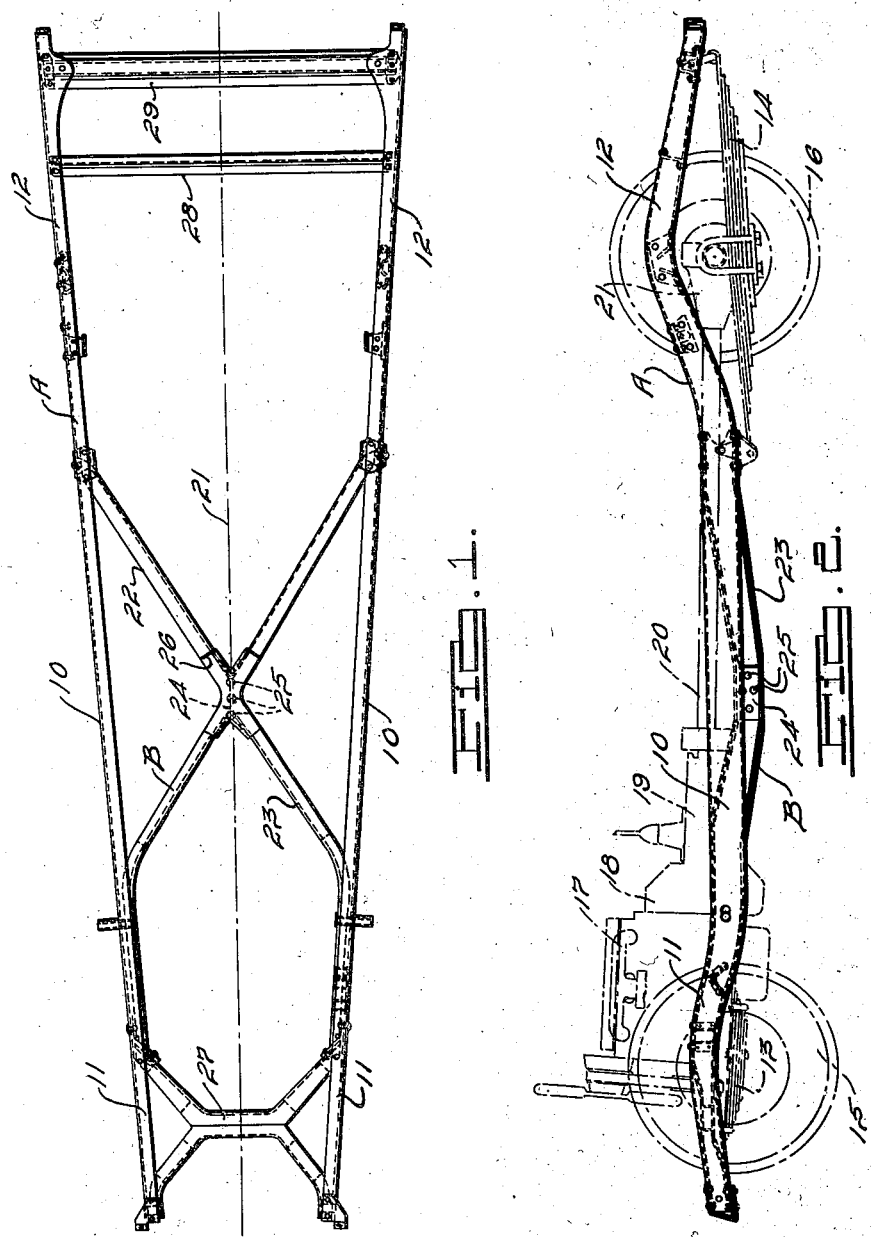
INVENTOR.
Frederic W. Slack.
BY
ATTORNEYS.

Patented May 18, 1937

2,080,748

UNITED STATES PATENT OFFICE 2,080,748

MOTOR VEHICLE FRAME

Frederic W. Slack, Detroit, Mich., assignor to Chrysler Corporation, Highland Park, Mich., a corporation of Delaware Application June 15, 1935, Serial No. 26,705

2 Claims. (Cl. 280—106)

This invention relates to motor vehicles and refers more particularly to frame structures therefor.

One object of my invention is to provide a motor vehicle frame having improved rigidity, especially with respect to torsional stresses, while at the same time freely accommodating the vehicle propeller shaft, body and other parts of the vehicle operating or located directly above the frame.

More particularly I have provided an X-brace for the frame side rails which avoids the customary tunnel or the like at the center of the X-brace for accommodating the vehicle drive or propeller shaft. With my construction, the component parts of the X-brace may be directly rigidly connected at the center of the X without interference thereabove with the drive shaft, body or other parts of the vehicle. Furthermore, the desirable low center of gravity of the vehicle may be preserved with my construction together with the customary desired location of the drive shaft.

I attain these objects primarily by depressing the X-brace at the crossing point so that the propeller shaft goes over instead of through the X-brace. With such arrangement both V-shaped sides of the X member may be made continuous and welded or riveted directly together at the center thereby affording maximum rigidity with a minimum of weight and fabricating cost.

Further objects and advantages of my invention reside in the novel combination and arrangement of parts more particularly hereinafter described and claimed, reference being had to the accompanying drawing illustrating a typical embodiment of my invention and in which:

Fig. 1 is a top plan view of my frame structure.

Fig. 2 is a side elevational view of my frame structure, the power driving mechanism and wheel mountings being illustrated in association therewith.

In the drawing reference character A represents the frame structure herein illustrated as comprising the transversely spaced longitudinally extending side rails 10 which may be formed with the usual front and rear kick-up portions 11 and 12, respectively. Associated with the front and rear kick-up portions are the usual spring assemblies 13 and 14 for mounting the front and rear ground wheels 15 and 16 respectively.

In Fig. 2 I have illustrated in construction lines the vehicle driving engine 17, clutch 18 and transmission 19, the drive then passing, as will be readily understood, through the drive shaft 20 to the differential 21 for driving the rear wheels 16. The drive shaft 20 extends approximately along the vertical longitudinal midplane 21 of frame A.

It is desirable to locate the drive shaft 20 approximately in the plane of side rails 10 and it is also desirable to torsionally brace these side rails approximately at the longitudinal central zone of the frame and under such circumstances the drive shaft interferes with the torsional bracing, usually in the form of an X-brace, it having been found necessary prior to my invention to interrupt the center of the X-brace to provide a tunnel or the like for accommodating the drive shaft and the vertical displacement thereof incident to relative movement between the rear driving wheels 16 and frame A. The interruption of the X-brace to accommodate the drive shaft results in complication and expensive fabrication of the X-brace and furthermore prevents the realization of the desired maximum amount of torsional bracing at the longitudinal central region of the frame structure.

I have overcome the aforesaid difficulties and undesirable characteristics by providing the X-brace B which transversely connects the side rails 10 in an improved manner without disturbing the desired location of drive shaft 20. To this end the X-brace B is formed with the pair of substantially V-shaped side members 22 and 23, each of which has its unitary oblique arms rigidly attached to one of the side rails 10, these arms converging approximately at plane 21 where the apex of the V is flattened at 24 in abutting relationship with each other and rigidly directly secured together by welding or by rivets 25. If desired, the center of X-brace B may be additionally reinforced by the X-member 26 welded or otherwise suitably rigidly secured to the laterally diverging arms of the companion V-shaped members 22 and 23 comprising the X-brace B.

As will be best apparent from Fig. 2, the arms of X-brace B extend inwardly and downwardly from the side rails 10 so that the central region of the X-brace where the arms intersect is depressed so as to underlie the drive shaft 20 sufficiently to freely accommodate movement of the drive shaft. Furthermore, it will be noted that the X-brace B thereby extends downwardly of the side rails 10, the latter forming the upper profile of the frame structure whereby no part of the frame structure especially in the region of the X-brace projects above the side rails for interference with the motor vehicle body (not shown) or other parts of the vehicle. Therefore, the desired low center of gravity may be maintained for the vehicle and the vehicle floor may be located relatively low and approximately across the upper faces of side rails 10. It will also be noted that the depressed portion of the X-brace will not interfere with the desired amount of road clearance for the motor vehicle, the illustrated embodiment in Fig. 2 showing the upper portion of the X-brace center located on a level approximately along the lower flanges of side rails 10 while the drive shaft 20 at the region of the X-brace center is disposed approximately on a level with the upper flanges of side rails 10 leaving therebetween sufficient room to accommodate free vertical movement of propeller shaft 20 without interference with the frame structure.

In order to support the vehicle body and the power plant, and also to additionally connect side rails 10, further cross bracing structures may be provided as desired, some of which are illustrated in Fig. 1 by the cross brace structures 27, 28, and 29.

What I claim is:

1. In a motor vehicle frame structure, longitudinally extending side rails defining the uppermost profile of the frame structure, a substantially X-shaped brace connecting said side rails, said X-shaped brace comprising oblique arm members projecting inwardly and downwardly from said side rails to accommodate the vehicle drive shaft thereabove.

2. In a frame structure for a motor vehicle having a longitudinally extending drive shaft, transversely spaced side rails defining the uppermost profile of the frame structure, and a substantially X-shaped brace transversely connecting said rails and having its central zone depressed to accommodate said drive shaft thereabove.

FREDERIC W. SLACK.